(12) United States Patent
Kagawa

(10) Patent No.: US 6,356,591 B1
(45) Date of Patent: Mar. 12, 2002

(54) VIDEO AND AUDIO PROCESSING METHOD AND APPARATUS

(75) Inventor: Masaaki Kagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/533,417

(22) Filed: Mar. 22, 2000

Related U.S. Application Data

(63) Continuation of application No. 08/977,984, filed on Nov. 25, 1997, now Pat. No. 6,049,568.

(30) Foreign Application Priority Data

Nov. 26, 1996 (JP) .............................. 8-314925

(51) Int. Cl.⁷ .............................................. H04N 7/12
(52) U.S. Cl. ................................................. 375/240.26
(58) Field of Search ............................ 348/705, 845.2; 375/240.26

(56) References Cited

U.S. PATENT DOCUMENTS

| | | | | |
|---|---|---|---|---|
| 4,803,653 A | * | 2/1989 | Suzuki et al. | 711/148 |
| 5,621,840 A | * | 4/1997 | Kawamura et al. | 386/68 |
| 5,923,384 A | * | 7/1999 | Enomoto et al. | 348/705 |
| 6,002,455 A | * | 12/1999 | Enomoto et al. | 348/845.2 |
| 6,078,594 A | * | 6/2000 | Anderson et al. | 370/498 |

* cited by examiner

*Primary Examiner*—Chris Kelley
*Assistant Examiner*—Allen Wong
(74) *Attorney, Agent, or Firm*—Frommer Lawrence & Haug LLP; William S. Frommer; Gordon Kessler

(57) ABSTRACT

A video and audio data processing method and apparatus by which a plurality of sets of video data and audio data are processed so as to have a data format such as the SDI format with which they can be transmitted substantially simultaneously or in a common transmission period to a common transmission destination is disclosed. A plurality of compressed video data based on a plurality of video data are successively and repetitively extracted for each predetermined number of words while a plurality of digital audio data are successively and repetitively extracted for each predetermined number of words, and data segments each having a first data area in which the predetermined number of words of each digital audio data are placed and a second data area in which the predetermined number of words of each compressed video data are placed are successively formed such that the plurality of compressed video data individually representative of the plurality of video signals for a predetermined period are placed divisionally with the predetermined numbers of words in the second data areas of a predetermined number of successive data segments. The predetermined numbers of data segments are successively sent out.

4 Claims, 7 Drawing Sheets

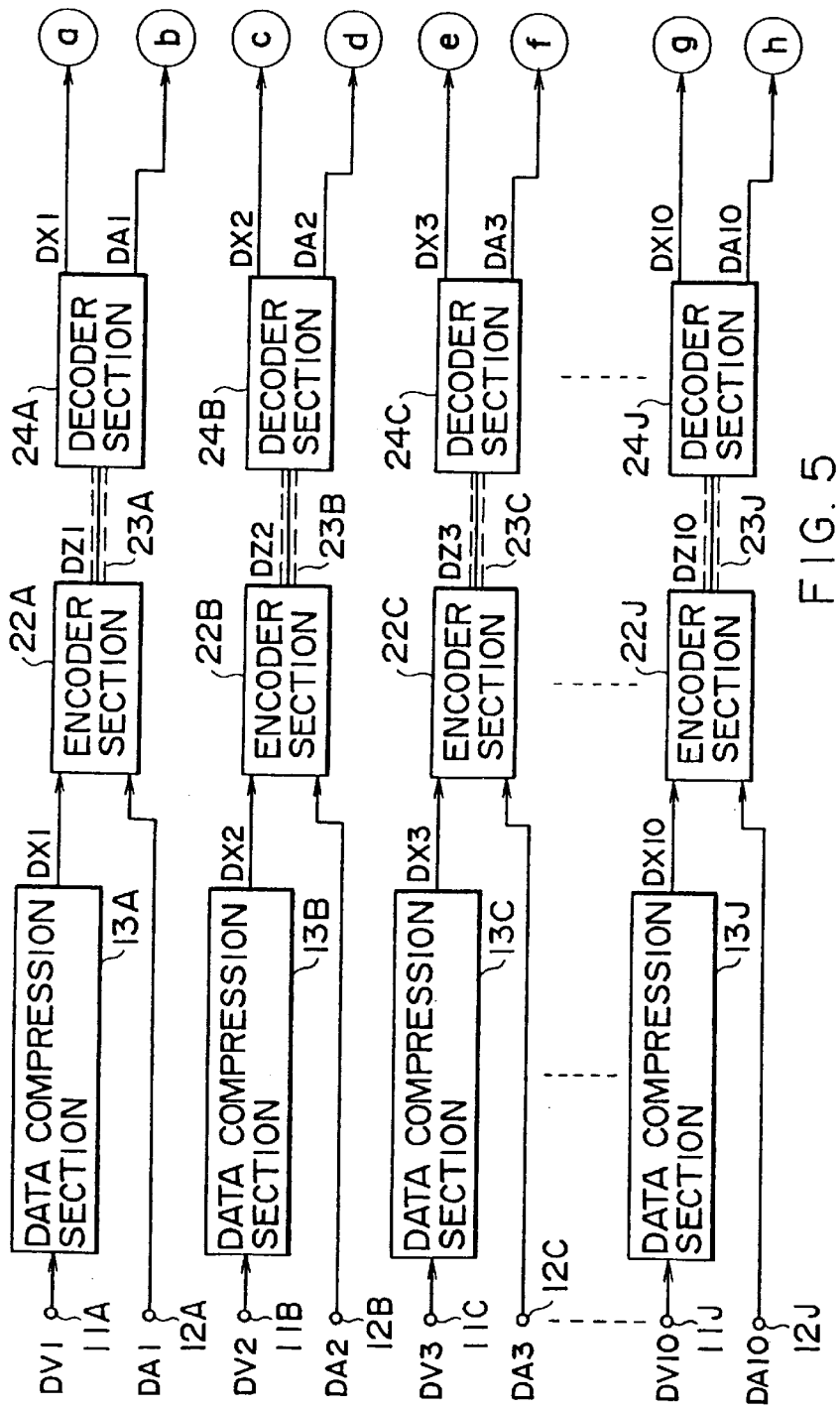
F I G. 5A
F I G. 5
| F I G. 5A | F I G. 5B |

VIDEO AND AUDIO PROCESSING METHOD AND APPARATUS

This Application is a Continuation of Ser. No. 08/977,984, Nov. 25, 1997, now U.S. Pat. No. 6,049,568.

BACKGROUND OF THE INVENTION

This invention relates to a video and audio data processing method and apparatus by which digital data representative of a video signal and digital data representative of an audio signal are processed so as to have a format for transmission thereof through a data transmission line such as a coaxial cable.

In order to allow transmission of digital video data (DV data) and digital audio data (DA data) obtained by digitizing a video signal and an audio signal which make signal elements which form a television broadcasting signal and representative of the video signal and the audio signal, respectively, through a data transmission line formed from, for example, a coaxial cable, the DV data and the DA data are normally processed so that they may have a format set in advance. Various formats are available for the format, and a format called serial data interface (SDI) format has been proposed as one of such formats.

In order to transmit DV data and DA data using the SDI format, the DV data and the DA data to be transmitted are divided into and placed as a series of successive data segments DP each of which corresponds to a one line period (1 H) beginning with a horizontal synchronizing signal SSH of a video signal SV. Each data segment DP includes an EAV part of a 4 word-structure, an ancillary area part of a 268 word-structure, an SAV part of a 4 word-structure and a payload area part of a 1,440 word-structure and is totally composed of 1,716 words.

In each data segment DP, DV data are placed for 1,440 words in the maximum in the payload area part, and DA data are placed for 268 words in the maximum in the ancillary area part. Where the DV data and the DA data to be transmitted are a video signal and an audio signal which form a television signal conforming to the NTSC system, DV data for a one frame period of the video signal (for the first and second field periods) and corresponding DA data are placed in 525 successive data segments DP.

FIG. 2 illustrates an example of a condition wherein DV data for a one frame period of a video signal and corresponding DA data are placed in 525 successive data segments DP. It is to be noted that reference symbol NL in FIG. 2 represents the number of each data segment DP. In the example illustrated in FIG. 2, DV data for a 240 line period which is a first field period for the video signal are placed in the payload area parts of 244 data segments DP beginning with the 20th one and ending with the 263rd one of the 525 successive data segments DP, and DA data corresponding to the DV data are placed in the ancillary area parts of the 244 data segments DP beginning with the 20th data segment DP and ending with the 263rd data segment DP. Further, DV data for another 240 line period which is a second field period for the video signal are placed in the payload area parts of 243 data segments DP beginning with the 283rd one and ending with the 525th one of the 525 successive data segments DP, and DA data corresponding to the DV data are placed in the ancillary area parts of the 243 data segments beginning with the 283rd data segment DP and ending with the 525th data segment DP.

When transmission of DV data and DA data is performed using the SDI format in such a manner as described above, data segments DP in the payload area parts of which the divided DV data are placed and in the ancillary area parts of which the divided DA data are placed are successively transmitted through data transmission lines. In this instance, one set of DV data and DA data is transmitted for each one data transmission line. Accordingly, in order to transmit a plurality of sets of DV data and DA data which are different from each other substantially simultaneously or in a common transmission period, a plural number of data transmission lines equal to the number of sets of DV data and DA data are required even if the data are to be transmitted to a common transmission destination.

For example, in order to transmit 10 sets of DV data and DA data substantially simultaneously or in a common transmission period to a common transmission destination, 10 data transmission lines are required, and if it is assumed that each of the data transmission lines is formed by a coaxial cable, then it is required to lay 10 coaxial cables. To provide a plurality of data transmission lines each formed from, for example, a coaxial cable in this manner gives rise to complication and increase in scale of an apparatus or equipment for data transmission and further to an increase in cost for data transmission.

SUMMARY OF THE INVENTION

It is an object of the present invention to provide a video and audio data processing method and apparatus by which, when a plurality of sets of DV data and DA data are to be processed so as to have a data format such as the SDI format which allows them to be transmitted substantially simultaneously or in a common transmission period to a common transmission destination, the necessity for provision of a number of data transmission lines equal to the number of sets of DV data and DA data in order to allow transmission of the plurality of sets of DV data and DA data can be eliminated to eliminate complication and increase in scale of an apparatus or equipment for data transmission and decrease the cost for data transmission.

In order to attain the object described above, according to an aspect of the present invention, there is provided a video data processing method, comprising the steps of performing compressed video data selective extraction wherein data compression is performed for a plurality of digital video data individually representative of a plurality of video signals to obtain a plurality of compressed video data and a predetermined number of words are successively and repetitively extracted from each of the plurality of compressed video data and audio data selective extraction wherein a predetermined number of words are successively and repetitively extracted from a plurality of digital audio data individually representative of a plurality of audio signals, successively forming data segments each having a first data area in which the predetermined number of words of each of the plurality of digital audio data extracted by the audio data selective extraction are placed and a second data area in which the predetermined number of words of each of the plurality of compressed video data extracted by the video data selective extraction are placed such that the plurality of compressed video data individually representative of the plurality of video signals for a predetermined period are placed divisionally with the predetermined numbers of words in the second data areas of a predetermined number of the successive data segments, and successively sending out the predetermined numbers of data segments.

Preferably, each of the data segments corresponds to a one line period of a video signal, and the plurality of compressed video data representative of the plurality of video signals for the one frame period are placed divisionally with the predetermined number of words in the second data areas of a number of the successive data segments equal to the number of line periods which form the one frame period of the video signal.

According to another aspect of the present invention, there is provided a video data processing apparatus, comprising a plurality of data compression sections for performing data compression individually for a plurality of digital video data individually representative of a plurality of video signals to obtain a plurality of compressed video data, a plurality of first memory sections for storing the plurality of compressed video data obtained by the plurality of data compression sections and successively and repetitively reading out the plurality of compressed video data for each predetermined number of words, a plurality of second memory sections for storing a plurality of digital audio data individually representative of a plurality of audio signals and successively and repetitively reading out the plurality of digital audio data for each predetermined number of words, and an encoder section for successively forming data segments each having a first data area in which the predetermined number of words of each of the plurality of digital audio data read out from the plurality of second memory sections are placed and a second data area in which the predetermined number of words of each of the plurality of compressed video data read out from the plurality of first memory sections are placed such that the plurality of compressed video data individually representative of the plurality of video signals for a predetermined period are placed divisionally with the predetermined numbers of words in the second data areas of a predetermined number of the successive data segments and successively sending out the predetermined numbers of data segments.

Preferably, the encoder section forms data segments such that each of the data segments corresponds to a one line period of a video signal, and divisionally places the plurality of compressed video data representative of the plurality of video signals for the one frame period with the predetermined number of words into the second data areas of a number of the successive data segments equal to the number of line periods which form the one frame period of the video signal.

In the video and audio data processing method and the video and audio data processing apparatus according to the present invention described above, data segments formed for transmission of video data and audio data are placed, for each predetermined number of words of each of a plurality of audio data, into a first data area and placed, for each predetermined number of words of each of a plurality of compressed video data based on a plurality of video data, into a second area. Then, a group unit of data segments is formed from a predetermined number of successive data segments wherein the predetermined numbers of words of the audio data are placed in the first data areas and the predetermined numbers of words of the compressed video data are placed in the second data areas such that the plurality of compressed video data individually representative of the plurality of video signals for a predetermined period are placed divisionally with the predetermined numbers of words in the second data areas of a predetermined number of the successive data segments included in each of the group units. In this instance, in the first data areas of the predetermined number of data segments included in each of the group units, the plurality of audio data corresponding to the plurality of compressed video data of the plurality of video signals for the predetermined period are divisionally placed with the predetermined numbers of words.

Where each of the data segments corresponds to a one line period of a video signal, the number of data segments included in each of the group units corresponds to the number of line periods which form a one frame period of the video signal, and in the predetermined number of data segments, the plurality of compressed video data corresponding to the one frame periods of the plurality of video signals are divisionally placed with the predetermined numbers of words in the second data areas while the plurality of audio data corresponding to the one frame periods of the video signals are divisionally placed with the predetermined numbers of words in the first data areas.

Consequently, a plurality of sets of compressed video data and audio data are successively placed, for each data amount corresponding to a one frame period of a video signal, into group units each of which is formed from a predetermined number of successive data segments. Then, the group units of the data segments formed successively in this manner can be successively transmitted through a single transmission line formed from a coaxial cable. Accordingly, a condition wherein a plurality of sets of compressed video data and audio data can be transmitted substantially simultaneously or in a common transmission period to a common transmission destination.

Therefore, where the video and audio data processing method or the video and audio data processing apparatus according to the present invention is applied to perform processing for formation of a large number of successive data segments so that a plurality of sets of video data and audio data may have a data format such as the SDI format with which they can be transmitted substantially simultaneously or in a common transmission period to a common transmission destination, in order to transmit a plurality of sets of video data and audio data, there is no need of providing a plural number of data transmission lines equal to the number of sets of video data and audio data. Therefore, such a situation that complication and increase in scale of an apparatus or equipment for data transmission are invited can be eliminated, and further, reduction in cost for data transmission can be achieved.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 3:
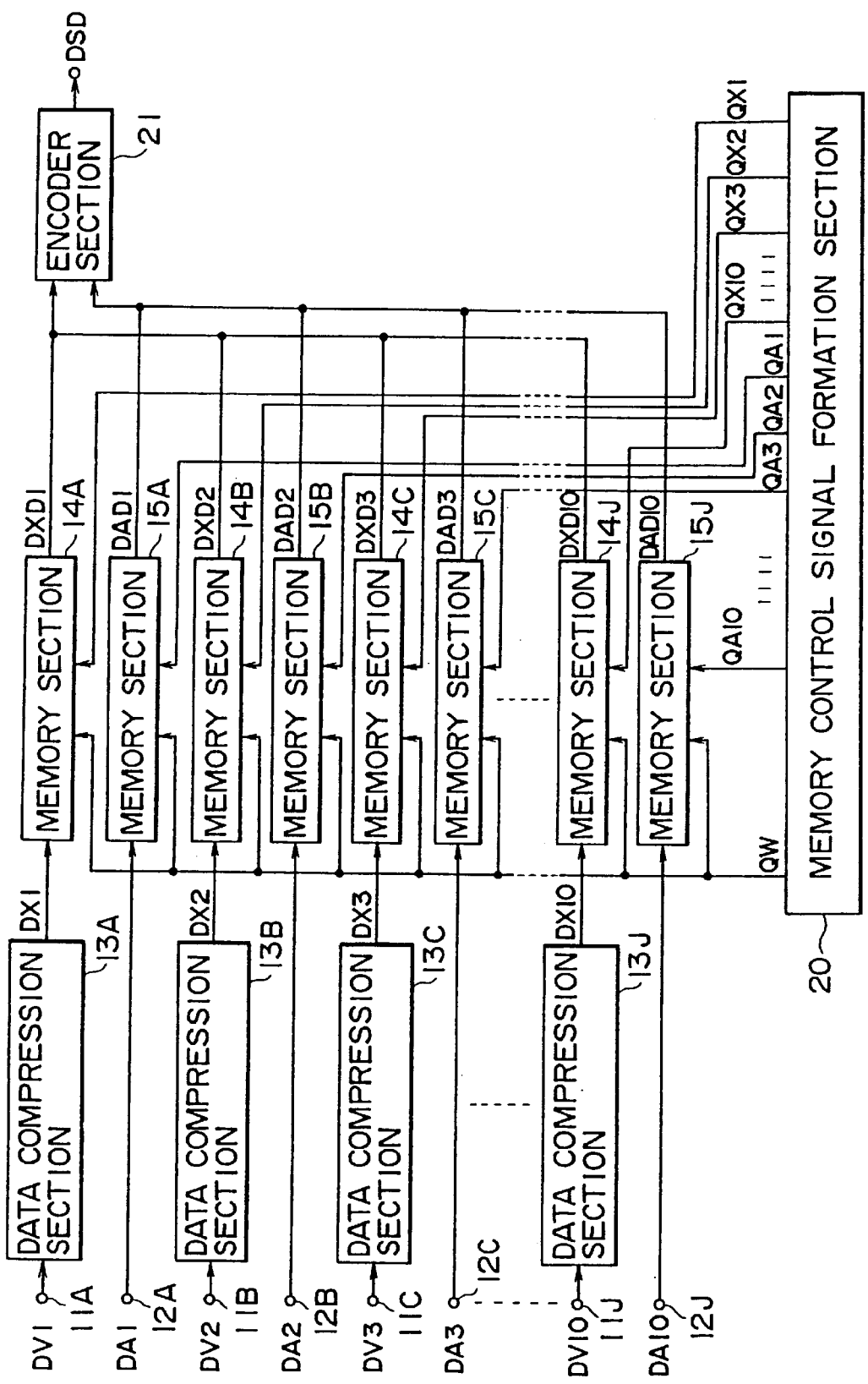
FIG. 3 is a block diagram of a video and audio data processing apparatus to which the present invention is applied.

Referring first to FIG. 3, there is shown a video and audio data processing apparatus to which the present invention is applied and on which a video and audio data processing method according to the present invention is performed.

The video and audio data processing apparatus receives 10 different DV data DV1, DV2, DV3, ..., DV10 representative of 10 different video signals through data input terminals data input terminals 11A to 11J thereof and receives 10 different DA data DA1, DA2, DA3, ..., DA10 representative of 10 different audio signals through data input terminals 12A to 12J.

Of the 10 different DV data DV1 to DV10 and the 10 different DA data DA1 to DA10, the set of the DV data DV1 and the DA data DA1, the set of the DV data DV2 and the DA data DA2, the set of the DV data DV3 and the DA data DA3, ..., and the set of the DV data DV10 and the DA data DA10 represent video signals and audio signals which form a television broadcasting signal conforming to the NTSC system. Thus, the video and audio data processing apparatus of FIG. 3 performs processing of forming, based on 10 sets of DV data and DA data representative of video signals and audio signals which form a television signal conforming to the NTSC system, data with which the video data and the audio data can be transmitted via a transmission line formed by, for example, a coaxial cable.

Each of the DV data DV1 to DV10 represents, for example, a corresponding video signal for a one line period (for a video signal 1 line period) with 1,440 words=1,440×8=11,520 bits. Accordingly, where the effective image line period number in a one frame period of the video signal is 480, each of the DV data DV1 to DV10 represents a corresponding video signal for a one frame period (for a video signal 1 line period) with 1,440×480=691,200 words= 691,200×8≈5.53 megabits (Mb).

Meanwhile, each of the DA data DA1 to DA10 represents a stereo audio signal for a 5 frame period of the video signal with 32,032×2=64,064 words. Accordingly, the audio signal corresponding to a one frame period of the video signal is represented with 64,064/5=12,812.8 words=64,064×8/5≈102.5 kilobits (Kb). In other words, each of the DA data DA1 to DA10 represents the audio signal corresponding to the video signal for a one frame period with 64,064/5=12,812.8 words.

The DV data DV1 to DV10 received at the data input terminals 11A to 11J are supplied to data compression sections 13A, 13B, 13C, ..., and 13J, respectively. The data compression section 13A performs data compression processing for the DV data DV1. The data compression processing performed for the DV data DV1, for example, compresses the DV data DV1 for 1,440×480=691,200 words=691,200×8≈5.53 megabits for a video signal one frame period to data of 1/10, that is, to data of 1,440×480/10=1,440×48=69,120 words=69,120×8≈553 kilobits. Consequently, since one period corresponds to a 30 frame period, compressed video data DX1 having a bit rate of 69,120×8×30≈16.6 megabits/second (Mb/s) are formed based on the DV data DV1 by the data compression section 13A.

Similarly, the data compression section 13B forms compressed video data DX2 having a bit rate lower than 16.6 megabits/second based on the DV data DV2, and the data compression sections 13C to 13J form compressed video data DX3 to DX10 having bit rates lower than 16.6 megabits/second based on the DV data DV3 to DV10, respectively.

The compressed video data DX1 to DX10 obtained from the data compression sections 13A to 13J are supplied to memory sections 14A, 14B, 14C, ..., and 14J, respectively. Meanwhile, the DA data DA1 to DA10 received at the data input terminals 12A to 12J are supplied directly to memory sections 15A, 15B, 15C, ..., and 15J, respectively.

A write control signal QW from a memory control signal formation section 20 is supplied to the memory sections 14A to 14J and the memory sections 15A to 15J. In response to the write control signal QW, the compressed video data DX1 to DX10 arriving from the data compression sections 13A to 13J are successively written into the memory sections 14A to 14J, respectively. Meanwhile, in response to the write control signal QW, the DA data DA1 to DA10 arriving from the data input terminals 12A to 12J are successively written into the memory sections 15A to 15J, respectively.

Read control signals QX1 to QX10 from the memory control signal formation section 20 are supplied to the memory sections 14A to 14J, respectively. The read control signals QX1 to QX10 are used to control the memory sections 14A to 14J to successively assume a reading out condition for a predetermined period of time. In particular, the read control signal QX1 first controls the memory section 14A to assume a reading out condition for a predetermined time, and after the reading out condition of the memory section 14A comes to an end, the read control signal QX2 controls the memory section 14B to assume a reading out condition for a next predetermined time. Then, after the reading out condition of the memory section 14B comes to an end, the read control signal QX3 controls the memory section 14C to assume a reading out condition for a further predetermined time. Such a sequence of operations is successively performed until after the read control signal QX10 controls the memory section 14J to assume a reading out condition for a predetermined period. Then, after the reading out condition of the memory section 14J comes to an end, the read control signal QX1 controls the memory section 14A to assume a reading out condition for a predetermined period again, and thereafter, the sequence of operations described above is repeated.

Here, the predetermined period in which a reading out condition is assumed by each of the memory sections 14A to 14J is selected, for example, to a period corresponding to the period required for reading out of compressed video data for 1,440 words written in each of the memory sections 14A to 14J. Accordingly, a condition wherein 1,440-words-data DXD1 of the compressed video data DX1 written in the memory section 14A are read out from the memory section 14A in response to the read control signal QX1, another condition wherein 1,440-words-data DXD2 of the compressed video data DX2 written in the memory section 14B are read out from the memory section 14B in response to the read control signal QX2, a further condition wherein 1,440-words-data DXD3 of the compressed video data DX3 written in the memory section 14C are read out from the memory section 14C in response to the read control signal QX3, ..., and a yet further condition wherein 1,440-words-data DXD10 of the compressed video data DX10 written in the memory section 14J are read out from the memory section 14J in response to the read control signal QX10 are successively assumed. Further, this sequence is repeated.

The 1,440-words-data DXD1 of the compressed video data DX1 to the 1,440-words-data DXD10 of the compressed video data DX10 successively y read out from the memory sections 14A to 14J in this manner are supplied to an encoder section 21.

Each of the compressed video data DD1 to DX10 written in the memory sections 14A to 14J, respectively, includes 1,440×48=69,120 words for a video signal 1 frame period. Accordingly, the 1,440-words-data DXD1 of the compressed video data DD1 to the 1,440-words-data DXD10 of the compressed video data DX10 are read out from the memory sections 14A to 14J by 1,440×48/1,440=48 reading out operations for each of the video signal 1 frame periods of the compressed video data DX1 to the video signal 1 frame periods of the compressed video data DX10.

Meanwhile, read control signals QA1, QA2, QA3, . . . , and QA10 from the memory control signal formation section 20 are supplied to the memory sections 15A to 15J, respectively. The read control signals QA1 to QA10 are used to control the memory sections 15A to 15J to successively assume a reading out condition for a predetermined period. In particular, the read control signal QA1 first controls the memory section 15A to assume a reading out condition for a predetermined time, and then after the reading out condition of the memory section 15A comes to an end, the read control signal QA2 controls the memory section 15B to assume a reading out condition for another predetermined time. Then, after the reading out condition of the memory section 15B comes to an end, the read control signal QA3 controls the memory section 15C to assume a reading out condition for a further period, and such a sequence of operations is successively performed until the read control signal QA10 controls the memory section 15J to assume a reading out condition for a yet further predetermined time. Then, after the reading out condition of the memory section 15J comes to an end, the read control signal QA1 controls the memory section 15A to assume a reading out condition for a predetermined period again, and thereafter, such a sequence of operations as described above is repeated.

Here, the predetermined period in which a reading out condition is assumed by each of the memory sections 15A to 15J is selected, for example, to a period corresponding to the period required for reading out of 268 words of each of the DA data DA1 to DA10 written in the memory sections 15A to 15J, respectively. Accordingly, a condition wherein 268-words-data DAD1 of the DA data DA1 written in the memory section 15A are read out from the memory section 15A in response to the read control signal QA1, another condition wherein 268-words-data DAD2 of the DA data DA2 written in the memory section 15B are read out from the memory section 15B in response to the read control signal QA2, a further condition wherein 268-words-data DAD3 of the DA data DA3 written in the memory section 15C are read out from the memory section 15C in response to the read control signal QA3, . . . , and a yet further condition wherein 268-words-data DAD10 of the DA data DA10 written in the memory section 15J are read out from the memory section 15J in response to the read control signal QA10 are successively assumed. Further, this sequence is repeated.

The 268-words-data DAD1 of the DA data DA1 to the 268-words-data DAD10 of the DA data DA10 successively read out from the memory sections 15A to 15J in this manner are supplied to the encoder section 21.

Each of the DA data DA1 to DA10 written in the memory sections 15A to 15J, respectively, includes 64,064/5=12, 812.8 words for a video signal 1 frame period. Accordingly, the 268-words-data DAD1 of the DA data DA1 to the 268-words-data DAD10 of the DA data DA10 are read out from the memory sections 15A to 153 by 64,064/(5×268) ≈47.8 reading out operations, that is, 48 reading out operations, for each of the video signal 1 frame periods of the DA data DA1 to the video signal 1 frame periods of the DA data DA10.

Figure 1:
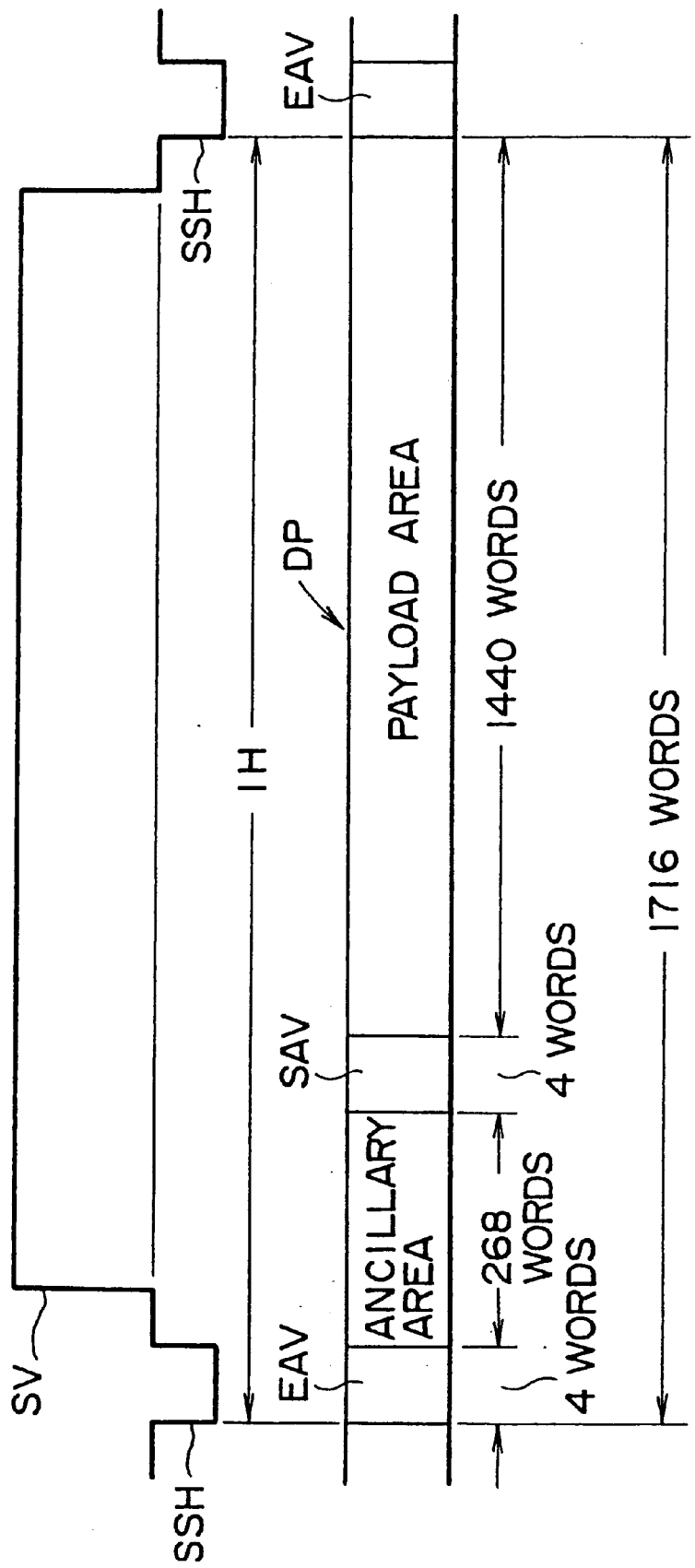
FIG. 1 is a diagrammatic view illustrating a concept of data segments according to the SDI format.
Figure 2:
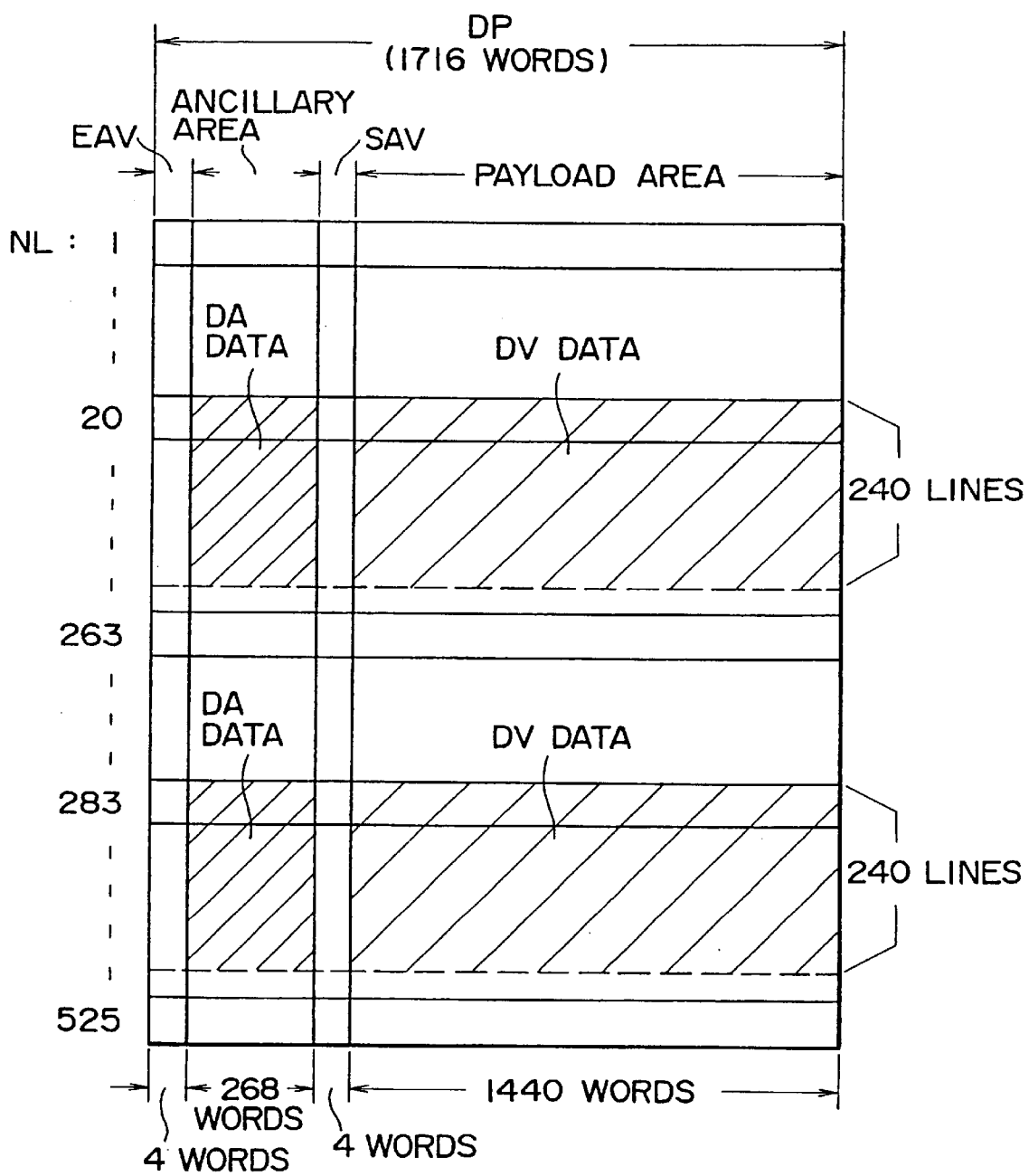
FIG. 2 is a diagrammatic view illustrating a concept of a data segment group according to the SDI format.

The encoder section 21 performs formatting of successively placing the 1,440-words-data DXD1 of the compressed video data DX1 to the 1,440-words-data DXD10 of the compressed video data DX10 successively read out from the memory sections 14A to 14J and the 268-words-data DAD1 of the DA data DA1 to the 268-words-data DAD10 of the DA data DA10 successively read out from the memory sections 15A to 15J into the payload area parts and the ancillary area parts, respectively, of data segments DP conforming to such an SDI format as illustrated in FIG. 1. Consequently, data segments DP wherein the 1,440-words-data DXD1 of the compressed video data DX1 to the 1,440-words-data DXD10 of the compressed video data DX10 are successively placed in the payload area parts and the 268-words-data DAD1 of the DA data DA1 to the 268-words-data DAD10 of the DA data DA10 are successively placed in the ancillary area parts are formed.

For such formatting of the encoder section 21, a data segment group including 525 successive data segments DP is prepared for placement of 48×1,440-words-data DXD1 which form video signal 1 frame periods of the compressed video data DX1 to 48×1,440-words-data DXD10 which form video signal 1 frame periods of the compressed video data DX10 and 48×268-words-data DAD1 which form video signal 1 frame periods of the DA data DA1 to 48×268-words-data DAD10 which form video signal 1 frame periods of the DA data DA10. Further, data segment groups each including 525 data segments DP in which the compressed video data DX1 to DX10 for video signal 1 frame periods and the DA data DA1 to DA10 for video signal 1 frame periods are placed are successively produced.

Figure 4:
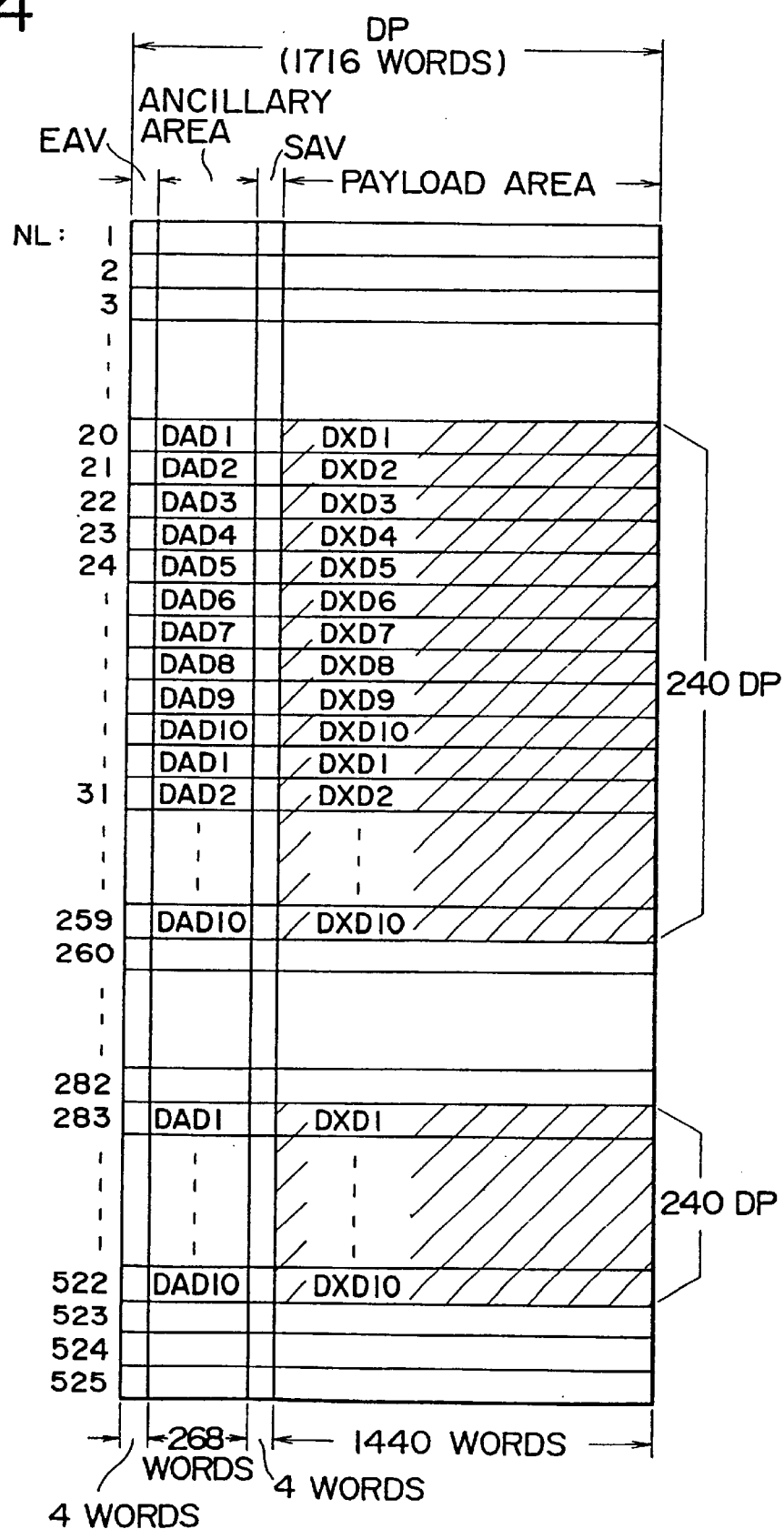
FIG. 4 is a diagrammatic view illustrating a concept of a data segment group formed by the video and audio data processing apparatus of FIG. 3.

In a data segment group formed from 525 successive data segments DP, as seen in FIG. 4 in which NL represents the number of each data segment DP, 1,440-words-data DXD1 to 1,440-words-data DXD10 which form video signal 1 frame periods of the compressed video data DX1 to DX10 and the 268-words-data DAD1 to 268-words-data DAD10 which form video signal 1 frame periods of the DA data DA1 to DA10 are not placed in the 19 data segments DP beginning with the first data segment DP and ending with the 19th data segment DP.

Then, in the 240 data segments DP beginning with the 20th data segment DP and ending with the 259th data segment DP, a condition wherein the 268-words-data DAD1 which form a video signal 1 frame period of the DA data DA1 to the 268-words-data DAD10 which form a video signal 1 frame period of the DA data DA10 are successively placed in the ancillary area parts of a 268 word-structure repetitively appears. Consequently, 24×268-words-data DAD1 to 24×268-words-data DAD10 each of which forms ½ of the DA data DA1 for a video signal 1 frame period to ½ of the DA data DA10 for a video signal 1 frame period are placed.

Further, in the 240 data segments DP beginning with the 20th data segment DP and ending with the 259th data segment DP, a condition wherein the 1,440-words-data DXD1 which form a video signal 1 frame period of the compressed video data DD1 to the 1,440-words-data DXD10 which form a video signal 1 frame period of the compressed video data DX10 are successively placed in the payload area parts of a 1,440 word-structure repetitively appears. Consequently, 24×1,440-words-data DXD1 to 24×1,440-words-data DXD10 each of which forms ½ of the compressed video data DX1 for a video signal 1 frame period to ½ of the compressed video data DX10 for a video signal 1 frame period are placed.

Then, in the 23 data segments DP beginning with the 260th data segment DP and ending with the 282nd data segment DP, the 1,440-words-data DXD1 to 1,440-words-data DXD10 which form the compressed video data DD1 to DX10 for a video signal 1 frame period, respectively, and the 268-words-data DAD1 to 268-words-data DAD10 which form the DA data DA1 to DA10 for a video signal 1 frame period, respectively, are not placed.

Further, in the succeeding 240 data segments DP beginning with the 283rd data segment DP to the 522nd data segment DP, a condition wherein the 268-words-data DAD1 which form a video signal 1 frame period of the DA data DA1 to the 268-words-data DAD10 which form a video signal 1 frame period of the DA data DA10 are successively placed in the ancillary area parts of a 268 word-structure repetitively appears. Consequently, 24×268-words-data DAD1 to 24×268-words-data DAD10 each of which forms ½ of the DA data DA1 for a video signal 1 frame period to ½ of the DA data DA10 for a video signal 1 frame period are placed.

Further, in the succeeding 240 data segments DP beginning with the 283rd data segment DP to the 522nd data segment DP, a condition wherein the 1,440-words-data DXD1 which form a video signal 1 frame period of the compressed video data DX1 to the 1,440-words-data DXD10 which form a video signal 1 frame period of the compressed video data DX10 are successively placed in the payload area parts of a 1,440 word-structure repetitively appears. Consequently, 24×1,440-words-data DXD1 to 24×1,440-words-data DXD10 each of which forms ½ of the compressed video data DX1 for a video signal 1 frame period to ½ of the compressed video data DX10 for a video signal 1 frame period are placed.

Then, in the 3 data segments DP beginning with the 523rd data segment DP and ending with the 525th data segment DP, the 1,440-words-data DXD1 to 1,440-words-data DXD10 which form video signal 1 frame periods of the compressed video data DX1 to DX10 and the 268-words-data DAD1 to 268-words-data DAD10 which form video signal 1 frame periods of the DA data DA1 to DA10, respectively, are not placed.

In this manner, in the data segment group which includes 525 successive data segments DP, 48×268-words-data DAD1 to 48×268-words-data DAD10 which form video signal 1 frame periods of the DA data DA1 to video signal 1 frame periods of the DA data DA10 are placed in the ancillary area parts of a 268 word-structure of totalling 480 data segments DP including the 240 data segments DP beginning with the 20th data segment DP and ending with the 259th data segment DP and the 240 data segments DP beginning with the 283rd data segment DP and ending with the 522nd data segment DP, and 48×1,440-words-data DXD1 to 48×1,440-words-data DXD10 which form video signal 1 frame periods of the DV data DV1 to video signal 1 frame periods of the DV data DV10 are placed in the payload area parts of a 1,440 word-structure of totalling 480 data segments DP including the 240 data segments DP beginning with the 20th data segment DP and ending with the 259th data segment DP and the 240 data segments DP beginning with the 283rd data segment DP and ending with the 522nd data segment DP. Then, data groups each formed from such 525 data segments DP are successively obtained from the encoder section 21 and form multiplexed video and audio data DSD.

The multiplexed video and audio data DSD sent out from the encoder section 21 include the set of the DV data DV1 and the DA data DA1 to the set of the DV data DV10 and the DA data DA10 which represent video signals and audio signals, respectively, which form 10 different television broadcasting signals conforming to the NTSC system while the DV data DV1 to DV10 are formed as the compressed video data DX1 to DX10. The multiplexed video and audio data DSD are transmitted via one transmission line connected to the output terminal of the encoder section 21 and formed from, for example, a coaxial cable.

Figure 5B:
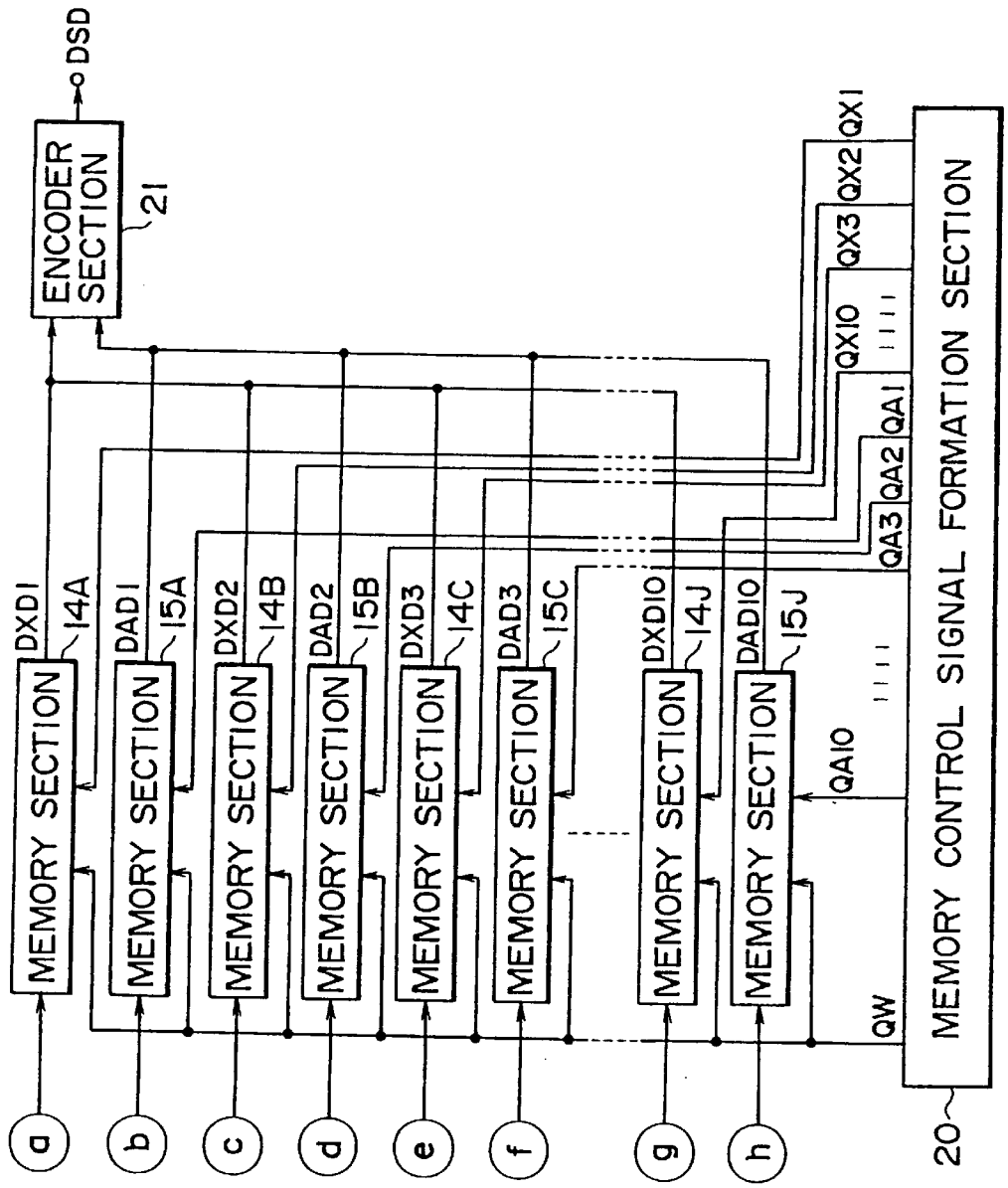
FIG. 5 is a block diagram of another video and audio data processing apparatus to which the present invention is applied.

Referring now to FIG. 5, there is shown another video and audio data processing apparatus to which the present invention is applied and on which the video and audio data processing method according to the present invention is performed. The video and audio data processing apparatus is a modification to and is different from the video and audio data processing apparatus described above with reference to FIG. 3 in that it additionally includes a set of an encoder section 22A, a data transmission line 23A and a decoder section 24A, another set of an encoder section 22B, a data transmission line 23B and a decoder section 24B, a further set of an encoder section 22C, a data transmission line 23C and a decoder section 24C, . . . , and a yet further set of an encoder section 22J, a data transmission line 23J and a decoder section 24J are interposed between the data compression section 13A and data input terminal 12A and the memory section 14A and memory section 15A, between the data compression section 13B and data input terminal 12B and the memory section 14B and memory section 15B, between the data compression section 13C and data input terminal 12C and the memory section 14C and memory section 15C, . . . , and between the data compression section 13J and data input terminal 12J and the memory section 14J and memory section 15J, respectively.

Figure 6:
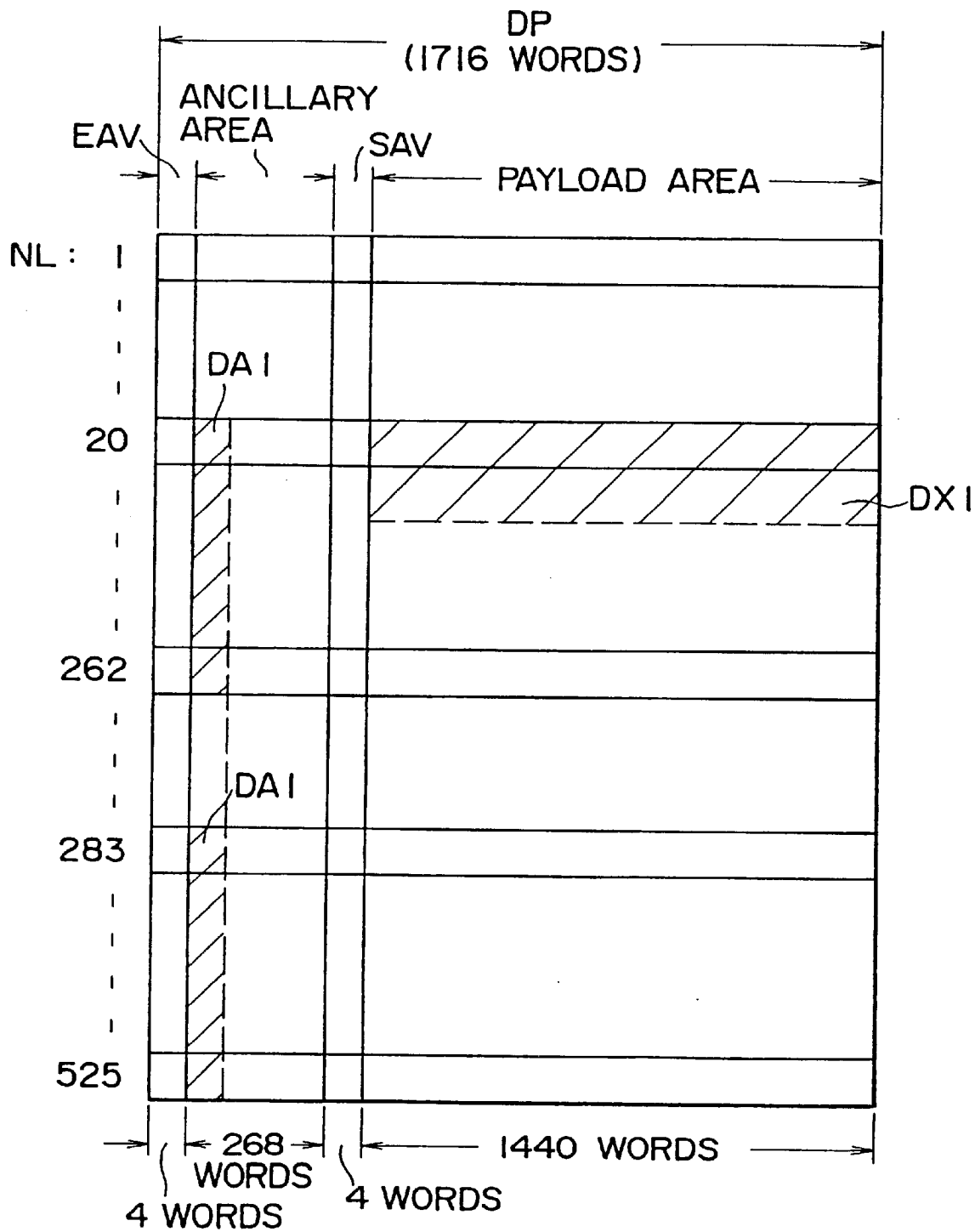
FIG. 6 is a diagrammatic view illustrating a concept of formatting of data performed for the data segment group illustrated in FIG. 4.

Compressed video data DX1 from the data compression section 13A and DA data DA1 from the data input terminal 12A are supplied to the encoder section 22A. The encoder section 22A places, as seen in FIG. 6, the DA data DA1 for video signal 1 frame periods into the ancillary area parts of 243 data segments DP beginning with the 20th data segment DP and ending with the 262nd data segment DP of a data segment group formed from 525 successive data segments DP and the ancillary area parts of the 243 data segments DP beginning with the 283rd data segment DP and ending with the 525th data segment DP and places compressed video data DX1 for video signal 1 frame periods into the payload area parts of 48 data segments DP beginning with the 20th data segment DP of the data segment group formed from the 525 successive data segments DP to effect formatting of the compressed video data DX1 and the DA data DA1 in accordance with the SDI format. Consequently, composite data DZ1 conforming to the SDI format are sent out from the encoder section 22A.

Similarly, compressed video data DX2 from the data compression section 13B and DA data DA2 from the data input terminal 12B, compressed video data DX3 from the data compression section 13C and DA data DA3 from the data input terminal 12C, . . . , and compressed video data DX10 from the data compression section 13J and DA data DA10 from the data input terminal 12J are supplied to the encoder sections 22B, 22C, . . . , and 22J, respectively. Then, the encoder sections 22B, 22C, . . . , and 22J perform formatting of the compressed video data DX2 and the DA data DA2, the compressed video data DX3 and the DA data DA3, . . . , and the compressed video data DX10 and the DA data DA10 in accordance with the SDI format and send out resulting composite data DZ2, DZ3, . . . , and DZ10 conforming to the SDI format, respectively.

The composite data DZ1 to DZ10 sent out from the encoder sections 22A to 22J are transmitted via the data transmission lines 23A, 23B, 23C, ..., and 23J and supplied to the decoder sections 24A, 24B, 24C, ..., and 24J, respectively. The decoder section 24A performs format releasing processing of the composite data DZ1 received via the data transmission line 23A to obtain the compressed video data DD1 and the DA data DA1 in a demultiplexed condition from each other.

Similarly, the decoder sections 24B to 24J perform format releasing processing of the composite data DZ2 transmitted via the data transmission line 23B to the composite data DZ10 transmitted via the decoder section 24J to obtain the compressed video data DX2 and the DA data DA2 to the compressed video data DX10 and the DA data DA10 in a demultiplexed condition from each other, respectively. Then, the compressed video data DX1 to DX10 obtained from the decoder sections 24A to 24J are supplied to the memory sections 14A to 14J, respectively. Meanwhile, the DA data DA1 to DA10 obtained from the decoder sections 24A to 24J are supplied to the memory sections 15A to 15J, respectively.

Writing and reading out of the compressed video data DX1 to DX10 into and from the memory sections 14A to 14J are performed in a similar manner as in the case illustrated in FIG. 3. Thus, 1,440-words-data DXD1 of the compressed video data DX1 to 1,440-words-data DXD10 of the compressed video data DX10 are read out from the memory sections 14A to 14J, respectively, and supplied to the encoder section 21. Meanwhile, writing and reading out of the DA data DA1 to DA10 into and from the memory sections 15A to 15J are performed in a similar manner as in that of the case illustrated in FIG. 3. Thus, 268-words-data DAD1 of the DA data DA1 to 268-words-data DAD10 of the DA data DA10 are read out from the memory sections 15A to 15J, respectively, and supplied to the encoder section 21.

The encoder section 21 performs formatting wherein it places the 1,440-words-data DXD1 of the compressed video data DX1 to the 1,440-words-data DXD10 of the compressed video data DX10 successively read out from the memory sections 14A to 14J and the 268-words-data DAD1 of the DA data DA1 to the 268-words-data DAD10 of the DA data DA10 successively read out from the memory sections 15A to 15J into the payload area parts and the ancillary area parts of data segments DP, respectively, in accordance with such an SDI format as illustrated in FIG. 1, in a similar manner as in the case illustrated in FIG. 3. consequently, from the encoder section 21, data segment groups each of which includes 525 data segments DP including those data segments DP wherein the 1,440-words-data DXD1 of the compressed video data DX1 to the 1,440-words-data DXD10 of the compressed video data DX10 are successively placed in the payload area parts and the 268-words-data DAD1 of the DA data DA1 to the 268-words-data DAD10 of the DA data DA10 are successively placed in the ancillary area parts are successively obtained to form multiplexed video and audio data DSD.

Also the multiplexed video and audio data DSD sent out from the encoder section 21 in this manner include the set of the DV data DV1 and the DA data DA1 to the set of the DV data DV10 and the DA data DA10 which represent video signals and audio signals, respectively, which form different television broadcasting signals conforming to the NTSC system while the DV data DV1 to DV10 are formed as the compressed video data DX1 to DX10. The multiplexed video and audio data DSD are transmitted via one transmission line connected to the output terminal of the encoder section 21 and formed from, for example, a coaxial cable.

It is to be noted that, while the video and audio data processing apparatus of the embodiments described above are constructed so as to perform processing, based on 10 sets of DV data and DA data representative of video signals and audio signals of television broadcasting signals conforming to the NTSC system, for forming data with which the DV data and the DA data can be transmitted via a single transmission line formed from, for example, a coaxial cable, in the video and audio data processing method or the video and audio data processing apparatus according to the present invention, the number of sets of DV data and DA data is not limited at all, but may be set suitably taking the data compression processing of DV data into consideration.

In the video and audio data processing method and the video and audio data processing apparatus described above, data segments formed for transmission of DV data and DA data are placed, for each predetermined number of words of each of a plurality of DA data, into a first data area and placed, for each predetermined number of words of each of a plurality of compressed video data based on a plurality of DV data, into a second area. Then, a group unit of data segments is formed from a predetermined number of successive data segments wherein the predetermined numbers of words of the DA data are placed in the first data areas and the predetermined numbers of words of the compressed video data are placed in the second data areas such that the plurality of compressed video data individually representative of the plurality of video signals for a predetermined period which is, for example, a one frame period are placed divisionally with the predetermined numbers of words in the second data areas of a predetermined number of the successive data segments included in each of the group units. In this instance, in the first data areas of the predetermined number of data segments included in each of the group units, the plurality of DA data corresponding to the plurality of compressed video data of the plurality of video signals for the predetermined period are divisionally placed with the predetermined numbers of words.

Consequently, a plurality of sets of compressed video data and DA data are successively placed, for each data amount corresponding to a one frame period of a video signal, into group units each of which is formed from a predetermined number of successive data segments. Then, the group units of the data segments formed successively in this manner can be successively transmitted through a single transmission line formed from a coaxial cable. Accordingly, a condition wherein a plurality of sets of compressed video data and DA data can be transmitted substantially simultaneously or in a common transmission period to a common transmission destination.

Therefore, where the video and audio data processing method or the video and audio data processing apparatus described above is applied to perform processing for formation of a large number of successive data segments so that a plurality of sets of DV data and DA data may have a data format such as the SDI format with which they can be transmitted substantially simultaneously or in a common transmission period to a common transmission destination, in order to transmit a plurality of sets of DV data and DA data, there is no need of providing a plural number of data transmission lines equal to the number of sets of DV data and DA data. Therefore, such a situation that complication and increase in scale of an apparatus or equipment for data transmission are invited can be eliminated, and further, reduction in cost for data transmission can be achieved.

Having now fully described the invention, it will be apparent to one of ordinary skill in the art that many changes and modifications can be made thereto without departing from the spirit and scope of the invention as set forth herein.

What is claimed is:

1. A serial data transmission apparatus comprising;

memory means for storing compressed video data and audio data;

memory control means for controlling read timing of said compressed video data and audio data stored in said memory means; and encode means for encoding said compressed video data and audio data read out from said memory means into serial data, said serial data comprising at least one digital packet, said at least one digital packet comprising:

a payload portion into which said compressed serial video data is inserted;

a first start synchronizing code storage portion positioned at a preceding portion of said payload portion into which a start synchronizing code is inserted, said start synchronizing code indicating a start of said compressed video data inserted in said payload portion;

a first end synchronizing code storage portion into which an end synchronizing code is inserted, said end synchronizing code indicating an end of said compressed video data inserted into said payload portion; and an ancillary data storage portion positioned between said first end synchronizing code storage portion and said first start synchronizing code storage portion, and into which data including said audio data is inserted;

wherein each of a plurality of channels of said compressed video data and said audio data is inserted in said payload portion and said ancillary data storage portion of each of said at least one digital packet.

2. The transmission apparatus according to claim 1, wherein said serial data of said at least one digital packet is in an SDI format.

3. A serial digital data transmitting method, comprising the steps of:

storing a number of channels of compressed video data and audio data in memory;

reading out each channel of said compressed video data and audio data from said memory; and encoding said compressed video data and audio data into serial data comprising at least one digital packet, said at least one digital packet comprising:

a payload portion into which each channel of said compressed serial video data is inserted;

a first start synchronizing code storage portion positioned at a preceding portion of said payload portion into which a start synchronizing code is inserted, said start synchronizing code indicating a start of said compressed video data inserted in said payload portion;

a first end synchronizing code storage portion into which an end synchronizing code is inserted, said end synchronizing code indicating an end of said compressed video data inserted into said payload portion; and an ancillary data storage portion positioned between said first end synchronizing code storage portion and said first start synchronizing code storage portion, and into which data including said audio data is inserted;

wherein each of a plurality of channels of said compressed video data and said audio data is inserted in said payload portion and said ancillary data storage portion of each of said at least one digital packet.

4. The serial digital method according to claim 3, wherein said at least one digital packet is in an SDI format.

* * * * *